United States Patent
Bang

(10) Patent No.: US 11,417,218 B2
(45) Date of Patent: Aug. 16, 2022

(54) PLATOONING CONTROLLER AND METHOD THEREOF

(71) Applicants: HYUNDAI MOTOR COMPANY, Seoul (KR); KIA MOTORS CORPORATION, Seoul (KR)

(72) Inventor: Kyung Joo Bang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 267 days.

(21) Appl. No.: 16/822,604

(22) Filed: Mar. 18, 2020

(65) Prior Publication Data

US 2021/0110720 A1   Apr. 15, 2021

(30) Foreign Application Priority Data

Oct. 11, 2019  (KR) .................. 10-2019-0126419

(51) Int. Cl.
*G08G 1/00* (2006.01)
*G05D 1/02* (2020.01)

(52) U.S. Cl.
CPC .............. *G08G 1/22* (2013.01); *G05D 1/0291* (2013.01)

(58) Field of Classification Search
CPC ...... G08G 1/22; G05D 1/0291; G05D 1/0293; B60W 30/165
See application file for complete search history.

(56) References Cited

U.S. PATENT DOCUMENTS

| 2018/0211546 | A1* | 7/2018 | Smartt | H04W 4/46 |
| 2018/0225975 | A1* | 8/2018 | Park | G06V 20/56 |
| 2020/0401160 | A1* | 12/2020 | Lacaze | G05D 1/0293 |
| 2021/0197826 | A1* | 7/2021 | Baum | B60W 30/165 |
| 2021/0197827 | A1* | 7/2021 | Baum | B60W 60/001 |

FOREIGN PATENT DOCUMENTS

| JP | 2016146131 A | * | 8/2016 | |
| WO | WO-2018039114 A1 | * | 3/2018 | B60R 16/0231 |

OTHER PUBLICATIONS

English Translation: Kondo, JP 2016-146131 A, Aug. 12, 2016, Japanese Patent Office Patent Publication (Year: 2016).*

* cited by examiner

*Primary Examiner* — Nadeem Odeh
(74) *Attorney, Agent, or Firm* — Lempia Summerfield Katz LLC

(57) ABSTRACT

A platooning controller and a method thereof include a processor configured to perform a platooning control and a communicator configured perform a vehicle-to-vehicle (V2V) communication in a platooning line. The processor calculates a waiting time for an expected departure of an outside vehicle based on surrounding information when the outside vehicle cuts in the platooning line during platooning. The processor forms a platoon again when the outside vehicle does not depart from the platooning line after the waiting time.

20 Claims, 7 Drawing Sheets

PLATOONING CONTROLLER AND METHOD THEREOF

CROSS-REFERENCE TO RELATED APPLICATION

This application claims the benefit of priority to Korean Patent Application No. 10-2019-0126419, filed in the Korean Intellectual Property Office on Oct. 11, 2019, the entire contents of which are incorporated herein by reference.

TECHNICAL FIELD

The present disclosure relates to a platooning controller and a method thereof. More particularly, the present disclosure relates to technologies of controlling to avoid and drive around an outside vehicle which cuts in a platooning line during platooning.

BACKGROUND

Platooning is a technology, in which a plurality of vehicles perform autonomous driving in a state that the plurality of vehicles are arranged at a specified interval in line. While the plurality of vehicles are platooning, a leading vehicle, which is a vehicle located in the frontline of a platooning line, may control one or more following vehicles, which follow the leading vehicle. The leading vehicle may maintain the interval between the plurality of vehicles included in the platooning line. The leading vehicle may further exchange information about behaviors and situations of the plurality of vehicles included in the platooning line using vehicle-to-vehicle (V2V) communication. A clearance between vehicles included in a platooning group may be adjusted according to an intention of a driver while driving.

When an outside vehicle cuts in a platooning line during platooning, platooning vehicles behind the outside vehicle increase an inter-vehicle distance to travel. The platooning vehicles manually wait until the outside vehicle departs from the platooning line by itself. When the outside vehicle departs from the platooning line, the platooning vehicles behind the outside vehicle accelerate again to form a platoon again.

However, when the outside vehicle, which cuts in, travels for a long time without departing from the platooning line, it is impossible to continue forming a platoon again. When several outside vehicles cut in or when a leading line and a tail end line are away from each other to a point wherein it is impossible to perform vehicle-to-vehicle (V2V) communication, the platooning is released.

In other words, in the existing technology, when a platooning vehicle in front of an outside vehicle and a following vehicle behind the outside vehicle are away from each other, a driver manually should form a platoon again. This is because a vehicle speed difference, a cut-in of another outside vehicle, or the like, occurs and thus the platoon is released due to loss of V2V communication.

SUMMARY

The present disclosure has been made to solve the above-mentioned problems occurring in the prior art while advantages achieved by the prior art are maintained intact.

An aspect of the present disclosure provides a platooning controller for, when an outside vehicle cuts in between platooning vehicles, allowing a following line to automatically overtake the outside vehicle and join an old platooning line when the outside vehicle does not depart from the platooning line after a waiting time determined based on surrounding information. Thus, a time for maintaining the platooning line may be increased. The present disclosure further provides a method thereof.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a platooning controller may include: a processor configured to perform a platooning control and a communicator configured to perform a vehicle-to-vehicle (V2V) communication in a platooning line. The processor may calculate a waiting time for an expected departure of an outside vehicle based on surrounding information when the outside vehicle cuts in the platooning line during platooning. The processor may further form a platoon again when the outside vehicle does not depart from the platooning line after the waiting time.

In an embodiment, the processor may determine whether the outside vehicle is initially detected when the outside vehicle is in the middle of the platooning line.

In an embodiment, the processor may calculate an outside vehicle detection time from a time when the outside vehicle is initially detected to a current time.

In an embodiment, the processor may determine the waiting time for forming a platoon again, using a shape of a road around a host vehicle.

In an embodiment, the processor may predict that the outside vehicle will continue traveling on a current driving lane. The processor may further determine the waiting time as the shortest time, when the current driving lane is a left or right end lane and when no entrance and exit ramp is present within a threshold distance ahead of the current driving lane.

In an embodiment, the processor may predict that the outside vehicle will depart to an entrance and exit ramp. The processor may further determine the waiting time as a time when a tail end of the outside vehicle arrives at the entrance and exit ramp, when a current driving lane is a left or right end lane and when the entrance and exit ramp is present within a threshold distance ahead of the current driving lane.

In an embodiment, when a current driving lane is not a left or right end lane and when an entrance and exit ramp is present within the threshold distance ahead of the current driving lane, the processor may predict that the outside vehicle will change the current driving lane to move to the entrance and exit ramp. The processor may further determine the waiting time as a time less than or equal to the waiting time determined when the current driving lane is the left or right end lane and when the entrance and exit ramp is present within the threshold distance ahead of the current driving lane.

In an embodiment, the processor may determine a current situation where it is difficult to predict a lane change of the outside vehicle and may use a predetermined waiting time, when a current driving lane is not a left or right end lane and when no entrance or exit ramp is present within a threshold distance ahead of the current driving lane.

In an embodiment, the processor may compare the outside vehicle detection time with the waiting time to determine whether it is necessary to form the platoon again.

In an embodiment, the processor may determine whether a speed difference value between a first platooning vehicle, traveling in front of the outside vehicle, and a second platooning vehicle, traveling behind the outside vehicle, is greater than a predetermined threshold speed. The processor may further form the platoon again when the speed difference value between the first platooning vehicle, traveling in front of the outside vehicle, and the second platooning vehicle, traveling behind the outside vehicle, is greater than the predetermined threshold speed.

In an embodiment, the processor may determine whether a distance value between the first platooning vehicle, traveling in front of the outside vehicle, and the second platooning vehicle, traveling behind the outside vehicle, is greater than a predetermined threshold distance. The processor may further form the platoon again when the distance value between the first platooning vehicle, traveling in front of the outside vehicle, and the second platooning vehicle, traveling behind the outside vehicle, is greater than the predetermined threshold distance.

In an embodiment, the processor may increase an inter-vehicle distance from the outside vehicle: when an outside vehicle detection time is less than or equal to the waiting time; when a speed difference value between a first platooning vehicle, traveling in front of the outside vehicle, and a second platooning vehicle, traveling behind the outside vehicle, is less than or equal to a predetermined threshold speed value; and when a distance value between the first platooning vehicle, traveling in front of the outside vehicle, and the second platooning vehicle, traveling behind the outside vehicle, is less than or equal to a predetermined threshold distance.

In an embodiment, the processor may change a lane of a leading vehicle. The processor may further decelerate the leading vehicle and may control the leading vehicle to join behind a forefront vehicle among platooning vehicles, traveling behind the outside vehicle.

In an embodiment, the processor may decelerate platooning vehicles, traveling behind the forefront vehicle among the platooning vehicles, traveling behind the outside vehicle, such that the leading vehicle joins behind the forefront vehicle.

In an embodiment, the processor may control a line, including a small number of vehicles between a forward line and a following line, to join another or second line, including a large number of vehicles. The controlling may be performed when the platooning line is divided into the forward line, traveling in front of the outside vehicle, and the following line, traveling behind the outside vehicle with respect to the outside vehicle.

In an embodiment, the processor may control the second line, including the large number of vehicles, to travel at a same speed as the line, including the small number of vehicles. The processor may further control a tail end vehicle in the second line, including the large number of vehicles, to travel at a speed lower than the line including the small number of vehicles. The controlling may be performed when the line, including the small number of vehicles, changes its lane and when the tail end vehicle in the second line, including the large number of vehicles, is in a same location as a forefront vehicle in the first line, including the small number of vehicles.

In an embodiment, the platooning controller may further include a sensing device that senses whether the outside vehicle is in the middle of the platooning line.

According to another aspect of the present disclosure, a platooning control method may include detecting a presence of an outside vehicle in a platooning line during platooning. The platooning control method may further include calculating a waiting time for an expected departure of the outside vehicle based on surrounding information when the outside vehicle is present. The platooning control method may further include forming a platoon again when the outside vehicle does not depart from the platooning line after the waiting time.

In an embodiment, the platooning control method may further include calculating an outside vehicle detection time from a time when the outside vehicle is initially detected to a current time.

In an embodiment, the forming of the platoon again may include comparing the outside vehicle detection time with the waiting time. The forming of the platoon again may further include determining whether a speed difference value between a first platoon vehicle, traveling in front of the outside vehicle, and a second platooning vehicle, traveling behind the outside vehicle, is greater than a predetermined threshold speed. The forming of the platoon again may further include determining whether a distance value between the first platoon vehicle, traveling in front of the outside vehicle, and the second platooning vehicle, traveling behind the outside vehicle is greater than a predetermined threshold distance.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
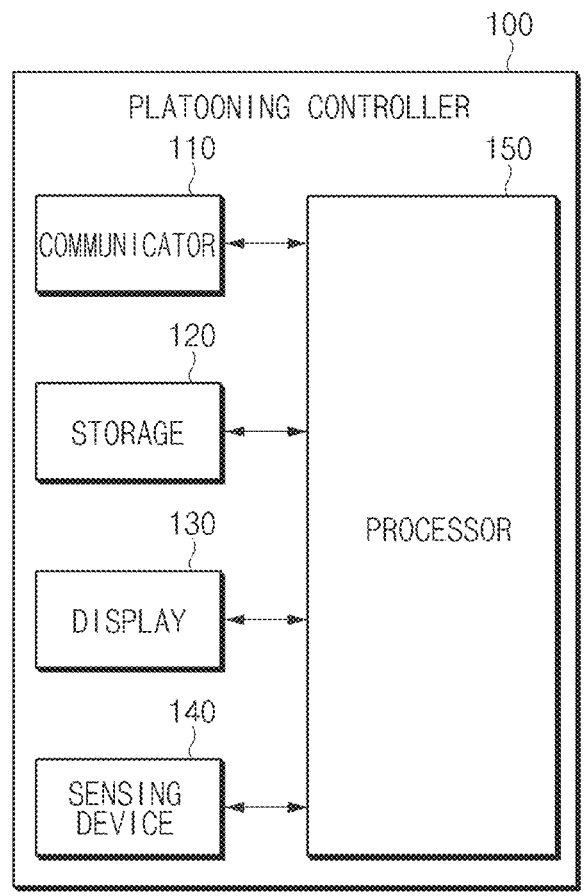
FIG. 1 is a block diagram illustrating a configuration of a vehicle system including a platooning controller according to an embodiment of the present disclosure.

Hereinafter, some embodiments of the present disclosure are described in detail with reference to the drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

An embodiment of the present disclosure discloses technologies of controlling to avoid and drive around an outside vehicle which cuts in a platooning line during platooning. Thus, the platooning line may be prevented from being released and a platooning control may be automatically performed such that a driver does not manually form a platoon again.

Hereinafter, a description are given in detail of embodiments of the present disclosure with reference to FIGS. 1 and 7.

A leading vehicle (LV) and a following vehicle (FV), which are included in a platooning group, may perform platooning on the road. The LV and the FV may travel while maintaining a specified distance. While the LV and the FV are traveling, they may adjust the distance between the LV and the FV.

FIG. 1 is a block diagram illustrating a configuration of a vehicle system including a platooning controller according to an embodiment of the present disclosure.

Referring to FIG. 1, a platooning controller 100 according to an embodiment of the present disclosure may be implemented in a vehicle. In this embodiment, the platooning controller 100 of the vehicle may be integrally formed with control units in the vehicle. In another embodiment, the platooning controller 100 of the vehicle may be implemented as a separate device to be connected with the control units of the vehicle by a separate connection means.

When an outside vehicle cuts in a platooning line during platooning, the platooning controller 100 may calculate a waiting time for an expected departure of the outside vehicle based on surrounding information. The platooning controller 100 may further form a platoon again when the outside vehicle does not depart from the platooning line after the waiting time.

To this end, the platooning controller 100 may include a communicator 110, a storage 120, a display 130, a sensing device 140, and a processor 150.

The communicator 110 may be a hardware device implemented with various electronic circuits to transmit and receive a signal through a wireless or wired connection. In an embodiment of the present disclosure, the communicator 110 may perform inter-vehicle communication through vehicle network communication. For example, the vehicle network communication may be controller area network (CAN) communication, local interconnect network (LIN) communication, Flex-Ray communication, or the like.

The communicator 110 may wirelessly transmit and receive information for maintaining a platooning line or information about a vehicle which participates in platooning for forming a platoon again between platooning vehicles. In this embodiment, the communicator 110 may perform a vehicle-to-vehicle (V2V) communication using wireless internet technology or short range communication technology.

Herein, the wireless internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

The storage 120 may store a sensing result of the sensing device 140 and data and/or algorithms necessary for an operation of the processor 150, or the like.

In an embodiment, the storage 120 may store a threshold speed to be compared with a speed difference value between a platooning vehicle in front of an outside vehicle and a platooning vehicle behind the outside vehicle. The storage 120 may also store a threshold distance to be compared with a distance value between the platooning vehicle in front of the outside vehicle and the platooning vehicle behind the outside vehicle, or the like. The threshold speed, the threshold distance, or the like may be preset by an experimental value.

In an embodiment, the storage 120 may store a waiting time for an expected departure of an outside vehicle, which is preset by sensitivity of a driver or an experimental value. Furthermore, the storage 120 may store an algorithm for calculating an outside vehicle detection time, an algorithm for determining whether there is the expected departure of the outside vehicle, or the like.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may include an input means for receiving a platooning control command from a user and an output means for outputting a result of determining to form a platoon again, a state and result of a platooning operation, such as a process of proceeding with forming a platoon again, or the like.

Herein, the input means may include a key button and may further include a mouse, a joystick, a jog-shuttle, a stylus pen, or the like. Furthermore, the input means may further include a soft key implemented on a display.

The output means may include the display and may further include a sound output means such as a speaker. In this embodiment, when a touch sensor such as a touch film, a touch sheet, or a touch pad is provided in the display, the display may operate as a touch screen. The display may be implemented in a form where the input means and the output means are integrated with each other.

In this embodiment, the display may include at least one of a liquid crystal display (LCD), a thin film transistor-LCD (TFT-LCD), an organic light-emitting diode (OLED) display, a flexible display, a field emission display (FED), and/or a three-dimensional (3D) display.

The sensing device 140 may include one or more sensors configured to detect that an outside vehicle cuts in front of a host vehicle, a shape of a road around the host vehicle, a vehicle which is platooning, or the like. The sensing device 140 may further measure a distance from the outside vehicle and/or a relative speed with the outside vehicle. To this end, the sensing device 140 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The processor 150 may be electrically connected with the communicator 110, the storage 120, the display 130, the sensing device 140, or the like. The processor 150 may further electrically control the respective components. The processor 150 may be an electrical circuit configured to execute instructions of software and may perform a variety of data processing and calculation described below.

When an outside vehicle cuts in a platooning line during platooning, the processor 150 may calculate a waiting time for an expected departure of the outside vehicle based on surrounding information. The processor 150 may further form a platoon again when the outside vehicle does not depart from the platooning line after the waiting time.

When the outside vehicle is in the middle of the platooning line, the processor 150 may determine whether the outside vehicle is initially detected. When the outside vehicle is initially detected, the processor 150 may calculate an outside vehicle detection time from a time when the outside vehicle is initially detected to a current time.

The processor 150 may determine the waiting time for forming a platoon again, using a shape of a road around the host vehicle.

As an example, when a current driving lane is a left or right end lane and when no entrance and exit ramp is present within a threshold distance ahead of the current driving lane, the processor 150 may predict that an outside vehicle will continue traveling on the current driving lane. The processor 150 may further determine the waiting time as a shortest time.

As an example, when a current driving lane is a left or right end lane and when an entrance and exit ramp is present within a threshold distance ahead of the current driving lane, the processor 150 may predict that the outside vehicle will depart to the entrance and exit ramp. The processor 150 may further determine the waiting time as a time when a tail end of the outside vehicle arrives at the entrance and exit ramp.

As an example, when a current driving lane is not a left or right end lane and when an entrance and exit ramp is present within a threshold distance ahead of the current driving lane, the processor 150 may predict that the outside vehicle will perform a lane change to move to the entrance and exit ramp. The processor 150 may further determine the waiting time as a time less than or equal to the waiting time determined when the current driving lane is the left or right end lane and when the entrance and exit ramp is present within the threshold distance ahead of the current driving lane.

As an example, when a current driving lane is not a left or right end lane and when no entrance and exit ramp is present within a threshold distance ahead of the current driving lane, the processor 150 may determine a current situation where it is difficult to predict a lane change of the outside vehicle and may use a predetermined waiting time.

The processor 150 may compare the outside vehicle detection time with the waiting time to determine whether it is necessary to form a platoon again. In other words, when the outside vehicle detection time is greater than the waiting time, the processor 150 may determine that it is necessary to form a platoon again.

The processor 150 may determine whether a speed difference value between a first platooning vehicle, traveling in front of the outside vehicle, and a second platooning vehicle, traveling behind the outside vehicle, is greater than a predetermined threshold speed. When the speed difference value between the first platooning vehicle, traveling in front of the outside vehicle and the second platooning vehicle, traveling behind the outside vehicle is greater than the predetermined threshold speed, the processor 150 may form a platoon again.

The processor 150 may determine whether a distance value between the first platooning vehicle, traveling in front of the outside vehicle, and the second platooning vehicle, traveling behind the outside vehicle, is greater than a predetermined threshold distance. When the distance value between the first platooning vehicle, traveling in front of the outside vehicle, and the second platooning vehicle, traveling behind the outside vehicle, is greater than the predetermined threshold distance, the processor 150 may form a platoon again.

The processor 150 may drive the host vehicle in an adaptive cruise control (ACC) mode to increase an inter-vehicle distance from the outside vehicle. The processor 150 may do so: when the outside vehicle detection time is less than or equal to the waiting time; when the speed difference value between the first platooning vehicle, traveling in front of the outside vehicle, and the second platooning vehicle, traveling behind the outside vehicle, is less than or equal to the predetermined threshold speed; and when the distance value between the first platooning vehicle, traveling in front of the outside vehicle, and the second platooning vehicle, traveling behind the outside vehicle, is less than or equal to the predetermined threshold distance.

When the first platooning vehicle, traveling in front of the outside vehicle, is a leading vehicle with respect to the outside vehicle, the processor 150 may perform a lane change of the leading vehicle. The processor 150 may further decelerate the leading vehicle and may control the leading vehicle to join behind a forefront vehicle among platooning vehicles, traveling behind the outside vehicle.

The processor 150 may decelerate platooning vehicles, traveling behind the forefront vehicle among the platooning vehicles, traveling behind the outside vehicle. Thus, the leading vehicle joins behind the forefront vehicle.

When a platooning line is divided into a forward line, traveling in front of the outside vehicle, and a following line, traveling behind the outside vehicle, the processor 150 may control a first line, including a small number of vehicles between the forward line and the following line, to join a second line, including a large number of vehicles.

When the first line, including the small number of vehicles, performs its lane change and when a tail end vehicle of the second line, including the large number of vehicles, is in a same location as a forefront vehicle of the first line, including the small number of vehicles, the processor 150 may control the second line, including the large number of vehicles, to travel at the same speed as the first line, including the small number of vehicles. The processor 150 may further control the tail end vehicle in the second line, including the large number of vehicles, to travel at a speed lower than the first line, including the small number of vehicles.

Thus, an embodiment of the present disclosure may predict that an outside vehicle will depart from a platooning line soon by itself using surrounding information to determine the waiting time. The embodiment of the present disclosure may further provide a method for forming a platoon again when the outside vehicle does not depart from the platooning line by itself. Thus, the embodiment of the present disclosure may minimize a time when the outside vehicle releases a platooning line and may automatically control a vehicle. Thus, a driver does not manually form a platoon again. Accordingly, a fuel efficiency effect may be increased by increasing a time when the platooning line is maintained and increasing convenience of the driver by automatically forming a platoon again.

Figure 2:
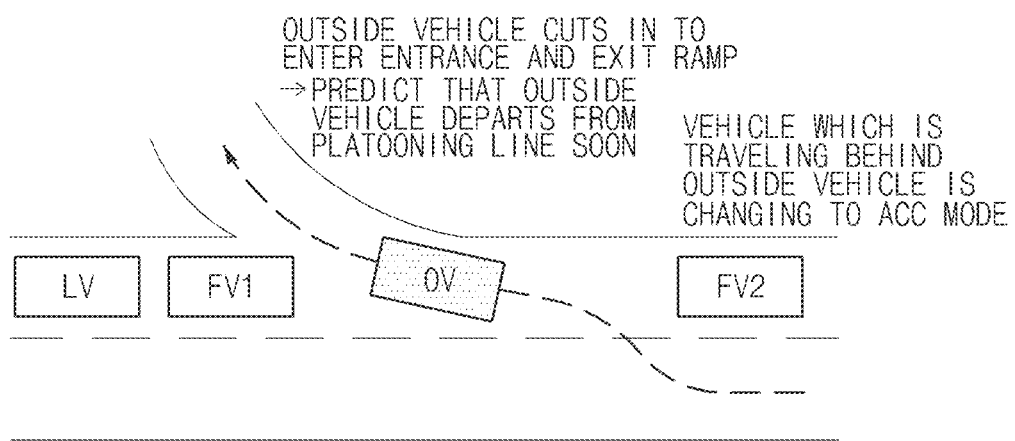
FIG. 2 is a drawing illustrating an example in which an outside vehicle cuts in a platooning line during platooning according to an embodiment of the present disclosure.

FIG. 2 is a drawing illustrating an example in which an outside vehicle cuts in a platooning line during platooning according to an embodiment of the present disclosure.

Referring to FIG. 2, when an outside vehicle OV cuts in to enter an entrance and exit ramp during platooning, a platooning controller 100 of a following vehicle FV2, traveling behind the outside vehicle OV, may predict that the outside vehicle OV will depart soon through the exit ramp.

Thus, the platooning controller 100 of the following vehicle FV2 may enter an ACC mode to increase an inter-vehicle distance between the outside vehicle OV and the following vehicle FV2. The platooning controller 100 of the following vehicle FV2 may control the following vehicle FV2 to travel while maintaining the inter-vehicle distance until the outside vehicle OV departs from the platooning line.

Figure 3:
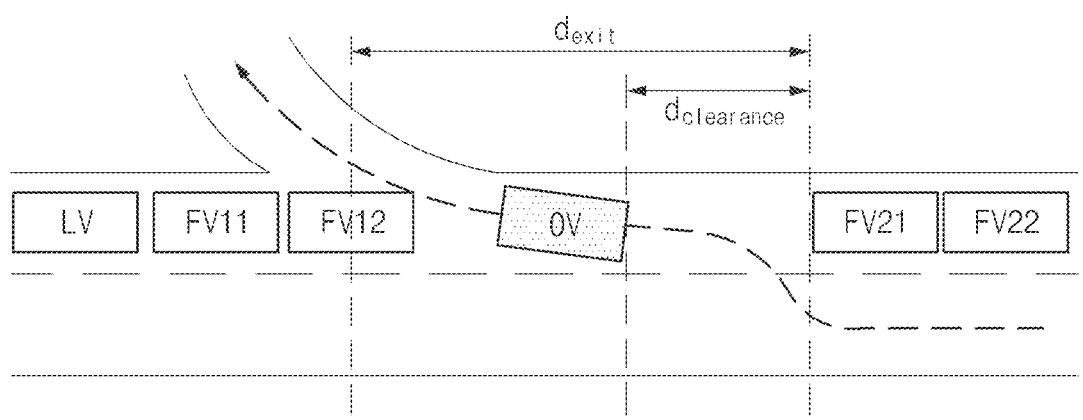
FIG. 3 is a drawing illustrating a process of detecting an outside vehicle in a platooning line during platooning according to an embodiment of the present disclosure.

FIG. 3 is a drawing illustrating a process of detecting an outside vehicle in a platooning line during platooning according to an embodiment of the present disclosure.

When an outside vehicle is initially detected in the middle of a platooning line, a platooning controller 100 of FIG. 1 may determine a waiting time for forming a platoon again using a shape of a road around a host vehicle and may calculate an outside vehicle detection time.

When the outside vehicle cuts in in a state that a current driving lane is a left or right end lane and no entrance and exit ramp is present within a threshold distance ahead of the current driving lane, the platooning controller 100 may predict that the outside vehicle will continue traveling on the lane and may determine the waiting time as a shortest time t1. This is because the outside vehicle cuts in when it is impossible to perform a lane change any longer.

As another example, when a current driving lane is a left or right end lane and when an entrance and exit ramp is present within a threshold distance ahead of the current driving lane, the platooning controller 100 may predict that the outside vehicle will move to the entrance and exit ramp when the outside vehicle arrives at the entrance and exit ramp.

The platooning controller 100 may further determine the waiting time as a time t2 when a tail end of the outside vehicle arrives at the entrance and exit ramp.

The platooning controller 100 may calculate the waiting time t2 using Equation 1 below.

$$t2=(d_{exit}-d_{clearance})/V_{ov}$$ [Equation 1]

Referring to FIG. 3, in an embodiment, the waiting time t2 is calculated when the outside vehicle OV cuts in the platooning line. In the Equation 1 above, $d_{exit}$ refers to a distance between a forefront vehicle FV21 of a following line between divided platooning lines and an entrance and exit ramp. $d_{clearance}$ refers to a distance between the forefront vehicle FV21 of the following line between the divided platooning lines and a tail end of the outside vehicle OV. $V_{ov}$ refers to a current speed of the outside vehicle OV.

As another example, when a current driving lane is not a left or right end lane and when an entrance and exit ramp is present within a threshold distance ahead of the current driving lane, the platooning controller 100 may predict that the outside vehicle will quickly change a next lane to move to the entrance and exit ramp and will depart from a platooning line. The platooning controller 100 may further determine the waiting time as a time greater than t1 and less than or equal to t2.

As another example, when a current driving lane is not a left or right end lane and when no entrance and exit ramp is present within a threshold distance ahead of the current driving lane, the platooning controller 100 may determine a time t4 considering sensitivity of a driver as a waiting time. This is because it is difficult to predict a lane change of the outside vehicle.

Figure 4:
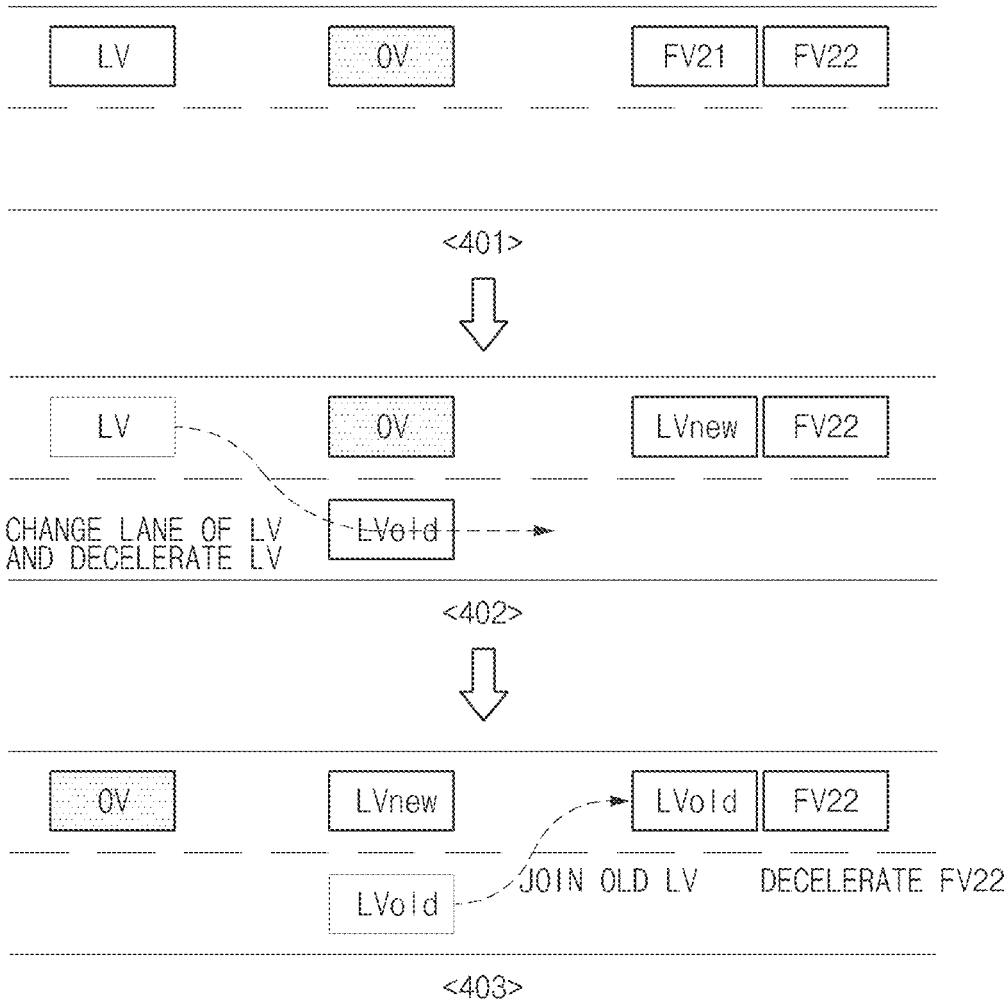
FIG. 4 is a drawing illustrating a process of forming a platoon again in a state that an outside vehicle cuts in a platooning line during platooning according to an embodiment of the present disclosure.

FIG. 4 is a drawing illustrating a process of forming a platoon again in a state that an outside vehicle cuts in a platooning line during platooning according to an embodiment of the present disclosure.

Referring to reference numeral 401 of FIG. 4, when only one leading vehicle LV is in front of an outside vehicle OV between divided platooning lines, in reference numeral 402, a forefront vehicle FV21 among following vehicles in a following line between the divided platooning lines may become a new leading vehicle LVnew. In reference numeral 403, the old leading vehicle LVold may change its lane to decelerate and may join behind the new leading vehicle LVnew. In this embodiment, when the following line between the divided platooning lines is configured with two or more vehicles, a tail end vehicle of the following line may decelerate. Thus, the old leading vehicle LVold joins in front of the tail end vehicle.

Figure 5:
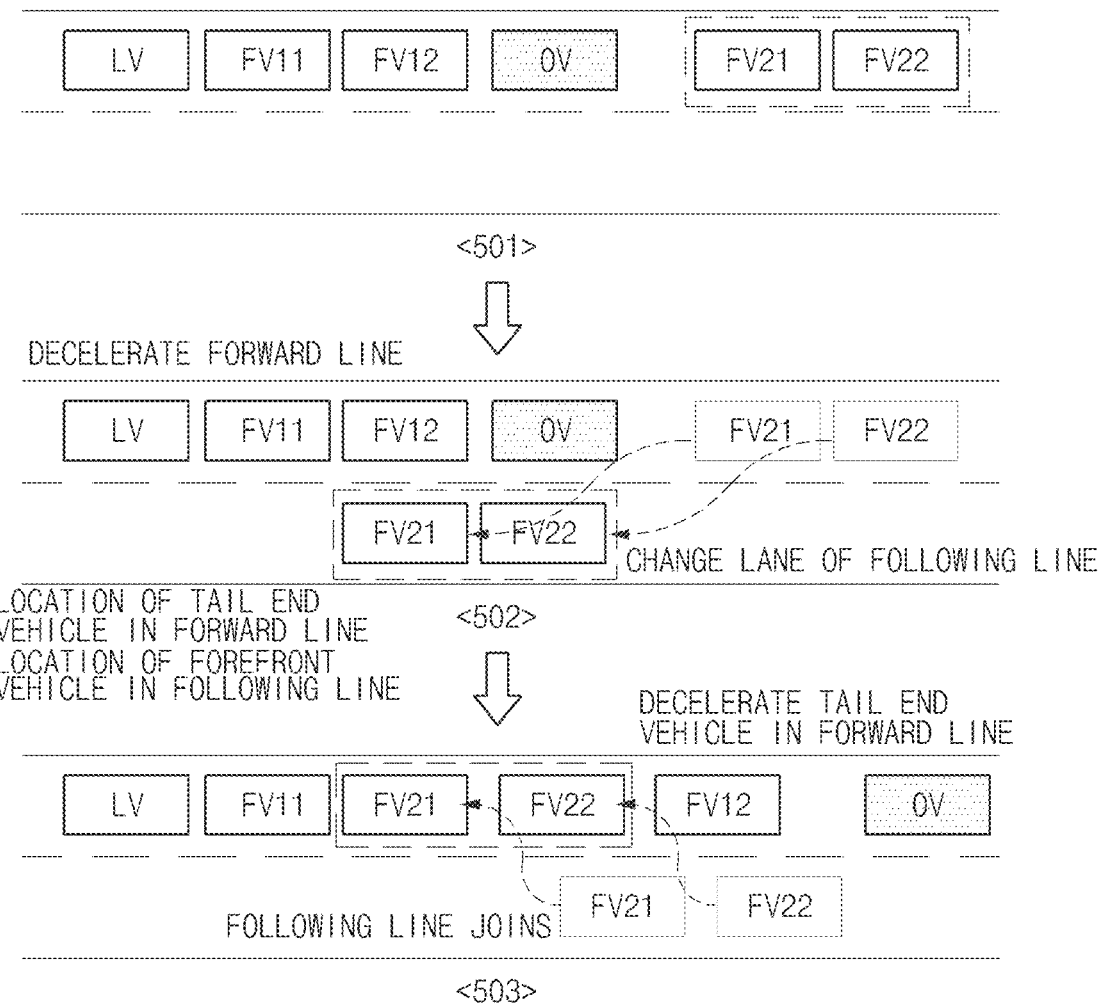
FIG. 5 is a drawing illustrating a process of moving one or more following vehicles behind an outside vehicle and forming a platoon again in a state that the outside vehicle cuts in a platooning line during platooning according to an embodiment of the present disclosure.

FIG. 5 is a drawing illustrating a process of moving one or more following vehicles behind an outside vehicle and forming a platoon again in a state that the outside vehicle cuts in a platooning line during platooning according to an embodiment of the present disclosure.

Referring to reference numeral 501 of FIG. 5, when there are several platooning vehicles LV, FV11, and FV12 in front of an outside vehicle OV between divided platooning lines, a line including a small number of vehicles between a forward line and a following line may join a counterpart line with respect to the outside vehicle OV. The forward line includes platooning vehicles LV, FV11, and FV12. The following line includes platooning vehicles FV21 and FV22.

In reference numeral 502, when the number of the vehicles FV21 and FV22 in the following line is less than the number of the vehicles LV, FV11, and FV12 in the forward line and while the following line changes its lane to travel, the forward line may decelerate.

In reference numeral 503, when a tail end vehicle FV12 in the forward line is in the same location as a forefront vehicle FV21 in the following line, the forward line may drive at the same speed as the following line. The tail end vehicle FV12 in the forward line may travel at a speed lower than the following line. Thus, the following line joins behind the forward line.

Figure 6:
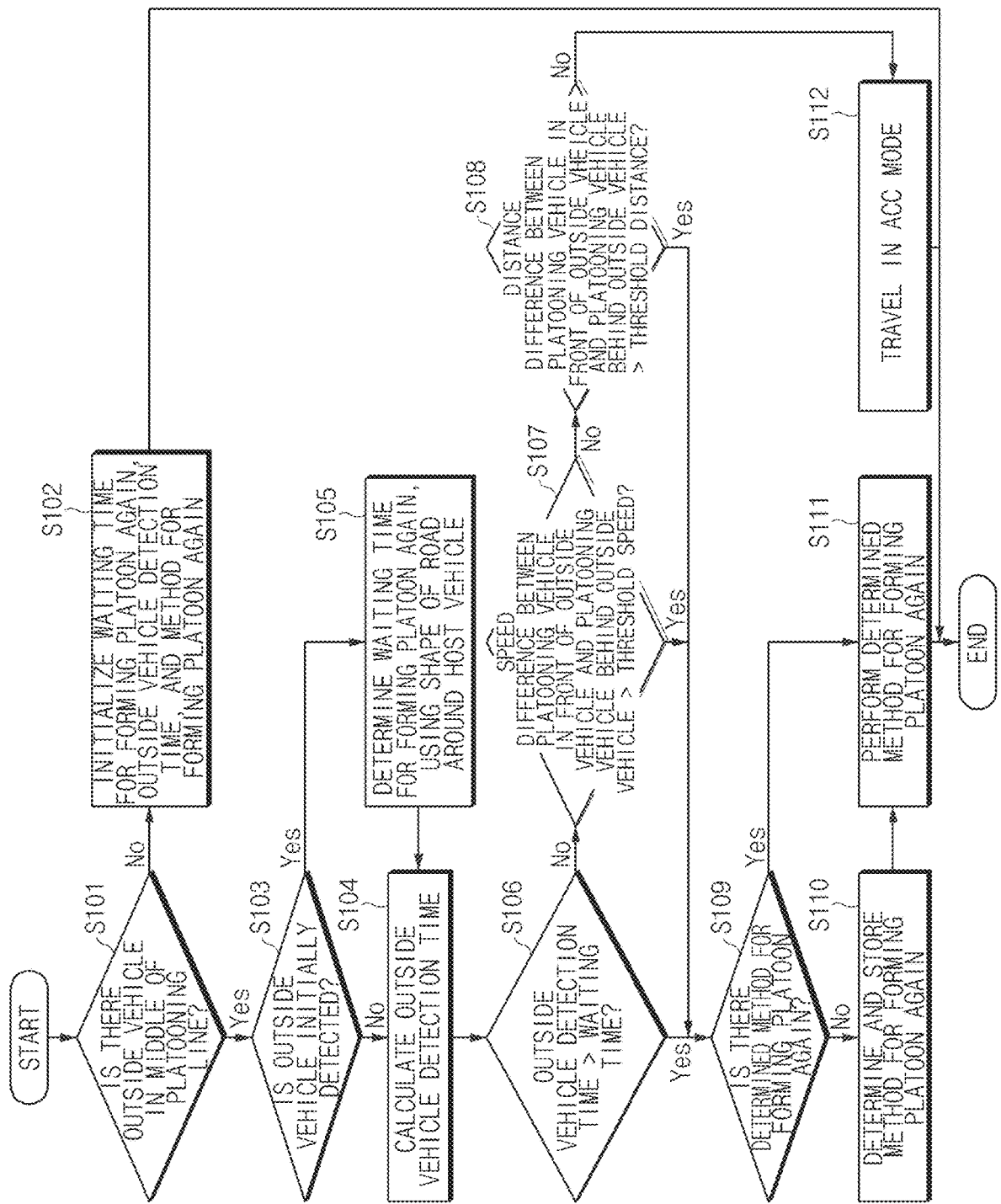
FIG. 6 is a flowchart illustrating a platooning control method according to an embodiment of the present disclosure.

Hereinafter, a description is given in detail of a platooning control method according to an embodiment of the present disclosure with reference to FIG. 6. FIG. 6 is a flowchart illustrating a platooning control method according to an embodiment of the present disclosure.

Hereinafter, it is assumed that a platooning controller 100 of FIG. 1 performs a process of FIG. 6. Furthermore, in the description of FIG. 6, an operation described as being performed by an apparatus may be understood as being controlled by a processor 150 of the platooning controller 100.

In S101, the apparatus may determine whether an outside vehicle is in the middle of a platooning line. In this embodiment, the apparatus may determine whether there is an outside vehicle using a forward sensor.

When no outside vehicle is in the middle of the platooning line, in S102, the apparatus may initialize a waiting time for forming a platoon again, an outside vehicle detection time, and a method for forming a platoon again. In other words, when no outside vehicle is in the middle of the platooning line, because there is a need to form a platoon again, the apparatus may initialize the waiting time for forming the platoon again, the outside vehicle detection time, and the method for forming the platoon again. The apparatus may perform general platooning control.

When the outside vehicle is in the middle of the platooning line, in S103, the apparatus may determine whether the outside vehicle is initially detected.

When the outside vehicle is not initially detected in the middle of the platooning line, in S104, the apparatus may calculate an outside vehicle detection time from a time when the outside vehicle is detected to a current time.

When the outside vehicle is initially detected in the middle of the platooning line, in S105, the apparatus may determine a waiting time for forming a platoon again using a shape of a road around a host vehicle. In operation 104, the apparatus may calculate an outside vehicle detection time.

In S106, the apparatus may determine whether the calculated outside vehicle detection time is greater than a predetermined waiting time or the waiting time calculated in S105.

When the outside vehicle detection time is less than or equal to the waiting time, in S107, the apparatus may determine whether a speed difference between a first platooning vehicle, travelling in front of the outside vehicle, and a second platooning vehicle, travelling behind the outside vehicle, is greater than a predetermined threshold speed. When the speed difference between the first platooning vehicle, travelling in front of the outside vehicle, and the second platooning vehicle, travelling behind the outside vehicle, increases to a constant value or more, the apparatus may enter S109 to form a platoon again, irrespective of whether the outside vehicle detection time is greater than the waiting time. This is because platooning release is imminent due to the loss of V2V communication.

When the speed difference between the first platooning vehicle, travelling in front of the outside vehicle, and the second platooning vehicle, travelling behind the outside vehicle, is less than or equal to the predetermined threshold speed, in S108, the apparatus may determine whether a distance difference between the first platooning vehicle, travelling in front of the outside vehicle, and the second platooning vehicle, travelling behind the outside vehicle, is greater than a predetermined threshold distance. The speed difference between the first platooning vehicle, travelling in front of the outside vehicle, and the second platooning vehicle, travelling behind the outside vehicle, is less than or equal to the predetermined threshold speed. However, when the distance difference between the first platooning vehicle, travelling in front of the outside vehicle, and the second platooning vehicle, travelling behind the outside vehicle, increases to a constant value or more, the apparatus may enter S109 to form a platoon again, irrespective of whether the outside vehicle detection time is greater than the waiting time. This is because platooning release is imminent due to the loss of V2V communication.

When the distance difference between the first platooning vehicle, travelling in front of the outside vehicle, and the second platooning vehicle, travelling behind the outside vehicle, is less than or equal to the predetermined threshold distance, in S112, the apparatus may drive the host vehicle in an ACC mode to increase an inter-vehicle distance from the outside vehicle.

In S109, the apparatus may determine whether there is a determined method for forming a platoon again. This step may be performed when the outside vehicle detection time is greater than the predetermined waiting time. In another embodiment, this step may be performed when the speed difference between the first platooning vehicle, travelling in front of the outside vehicle, and the second platooning vehicle, travelling behind the outside vehicle, is greater than the predetermined threshold speed. In another embodiment, this step may be performed when the distance difference between the first platooning vehicle, travelling in front of the outside vehicle, and the second platooning vehicle, travelling behind the outside vehicle, is greater than the predetermined threshold distance.

When there is no method for forming the platoon again, in S110, the apparatus may determine and store a method for forming a platoon again. When there is a determined method for forming the platoon again, in S111, the apparatus may control vehicles based on the determined method for forming the platoon again to form the platoon again. In this embodiment, before attempting to form a platoon again, the apparatus may drive the host vehicle in the ACC mode to increase an inter-vehicle distance from the outside vehicle such that a driver copes with a critical situation.

An embodiment of the present disclosure may predict whether an outside vehicle will depart from a platooning line by itself using surrounding information (e.g. road information) to determine a waiting time. The present disclosure may further determine and execute a method for forming a platoon again when the outside vehicle does not depart from the platooning line by itself after the waiting time elapses.

In this embodiment, in the method for forming the platoon again, a first platooning vehicle, travelling in front of the outside vehicle, may change its lane to decelerate and may join a second platooning line, travelling behind the outside vehicle. In another embodiment, a second platooning vehicle, travelling behind the outside vehicle, may change its lane to accelerate and may join a first platooning line, travelling in front of the outside vehicle.

Thus, an embodiment of the present disclosure may minimize a time when a platooning line is released by the outside vehicle. The present disclosure may automatically control a vehicle such that a driver does not manually form a platoon again. Thus, the fuel efficiency effect may be increased by increasing a time when the platooning line is maintained and the convenience of the driver may be increased by automatically forming a platoon again.

Figure 7:
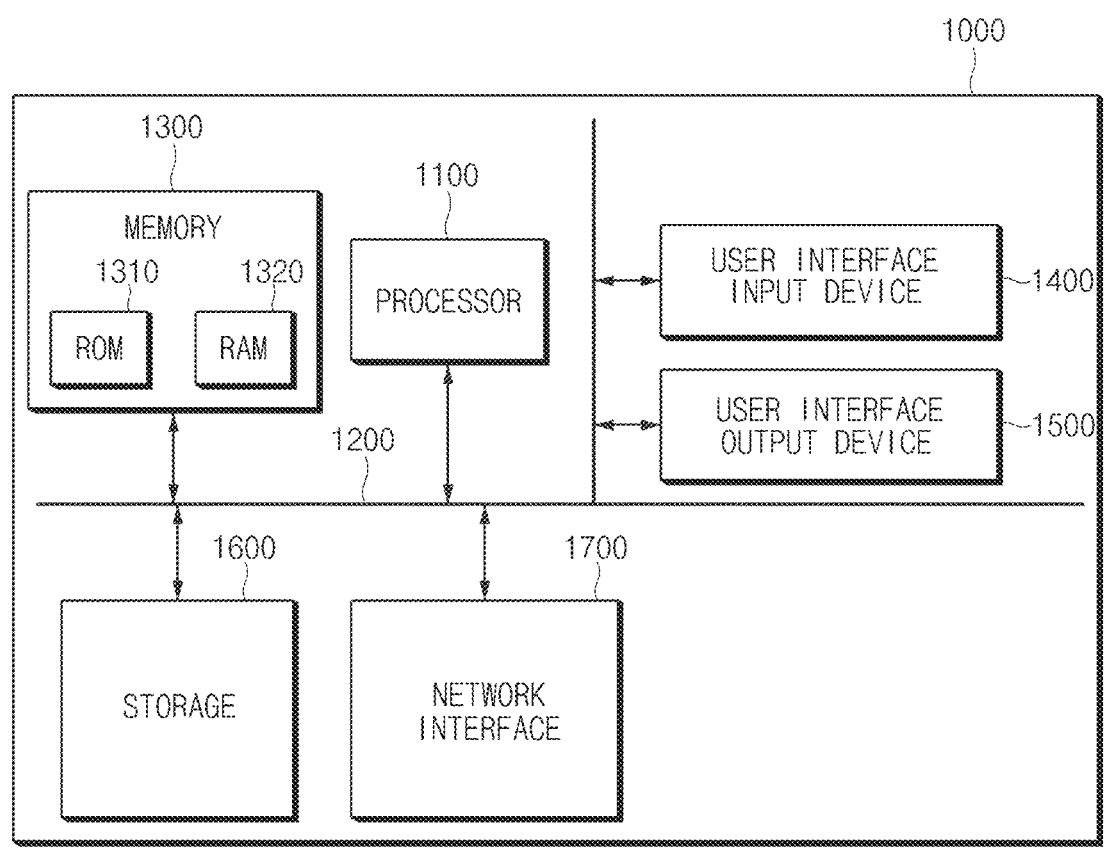
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM 1310 (Read Only Memory) and a RAM 1320 (Random Access Memory).

Thus, the operations of the method or the algorithm described in connection with the embodiments disclosed herein may be embodied directly in hardware or a software module executed by the processor 1100, or in a combination thereof. The software module may reside on a storage medium (in other words, the memory 1300 and/or the storage 1600) such as a RAM memory 1320, a flash memory, a ROM memory 1310, an EPROM memory, an EEPROM memory, a register, a hard disk, a removable disk, and a CD-ROM.

The storage medium may be coupled to the processor 1100. The processor 1100 may read information out of the storage medium and may record information in the storage medium. In another embodiment, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

When an outside vehicle cuts in between platooning vehicles, the present technology may allow a following line to automatically overtake the outside vehicle and join an old platooning line when the outside vehicle does not depart from the platooning line after a waiting time determined based on surrounding information. Thus, a time when the platooning line is maintained may be increased.

In addition, various effects directly or indirectly ascertained through the present disclosure may be provided.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. A platooning controller, comprising:
a processor configured to perform a platooning control; and
a communicator configured to perform a vehicle-to-vehicle (V2V) communication in a vehicle platooning line of platooning vehicles,
wherein the processor calculates a waiting time for an expected departure of an outside vehicle based on surrounding information when the outside vehicle cuts in the vehicle platooning line during platooning, and forms a platoon of the platooning vehicles again when the outside vehicle does not depart from the vehicle platooning line after the waiting time.

2. The platooning controller of claim 1, wherein the processor determines whether the outside vehicle is initially detected when the outside vehicle is in the middle of the vehicle platooning line.

3. The platooning controller of claim 1, wherein the processor calculates an outside vehicle detection time from a time when the outside vehicle is initially detected to a current time.

4. The platooning controller of claim 3, wherein the processor compares the outside vehicle detection time with the waiting time to determine whether it is necessary to form the platoon again.

5. The platooning controller of claim 4, wherein the processor determines whether a speed difference value between a first platooning vehicle, traveling in front of the outside vehicle and a second platooning vehicle, traveling behind the outside vehicle, is greater than a predetermined threshold speed and forms the platoon again when the speed difference value between the first platooning vehicle, traveling in front of the outside vehicle, and the second platooning vehicle, traveling behind the outside vehicle, is greater than the predetermined threshold speed.

6. The platooning controller of claim 5, wherein the processor determines whether a distance value between the first platooning vehicle, traveling in front of the outside vehicle, and the second platooning vehicle, traveling behind the outside vehicle, is greater than a predetermined threshold distance and forms the platoon again when the distance value between the first platooning vehicle, traveling in front of the outside vehicle, and the second platooning vehicle, traveling behind the outside vehicle, is greater than the predetermined threshold distance.

7. The platooning controller of claim 1, wherein the processor determines the waiting time for forming a platoon again, using a shape of a road around a host vehicle.

8. The platooning controller of claim 7, wherein the processor predicts that the outside vehicle will continue traveling on a current driving lane and determines the waiting time as a shortest waiting time when the current driving lane is a left or right end lane and when no entrance and exit ramp is present within a threshold distance ahead of the current driving lane, wherein the shortest waiting time is relative to waiting times under situations when the current driving lane is not the left or right end lane or under situations when at least one entrance and exit ramp is present within the threshold distance ahead of the current driving lane.

9. The platooning controller of claim 8, wherein the processor increases an inter-vehicle distance from the outside vehicle: when an outside vehicle detection time is less than or equal to the waiting time; when a speed difference value between a first platooning vehicle, traveling in front of the outside vehicle, and a second platooning vehicle, traveling behind the outside vehicle, is less than or equal to a predetermined threshold speed value; and when a distance value between the first platooning vehicle, traveling in front of the outside vehicle, and the second platooning vehicle, traveling behind the outside vehicle, is less than or equal to a predetermined threshold distance.

10. The platooning controller of claim 7, wherein the processor predicts that the outside vehicle will depart to an entrance and exit ramp and determines the waiting time as a time when a tail end of the outside vehicle arrives at the entrance and exit ramp when a current driving lane is a left or right end lane and when the entrance and exit ramp is present within a threshold distance ahead of the current driving lane.

11. The platooning controller of claim 7, wherein, when a current driving lane is not a left or right end lane and when an entrance and exit ramp is present within a threshold distance ahead of the current driving lane, the processor predicts that the outside vehicle will change the current driving lane to move to the entrance and exit ramp and determines a different waiting time as a time less than or equal to the waiting time determined when the current driving lane is the left or right end lane and when the entrance and exit ramp is present within the threshold distance ahead of the current driving lane.

12. The platooning controller of claim 7, wherein the processor determines a current situation where it is difficult to predict a lane change of the outside vehicle and uses a predetermined waiting time when a current driving lane is not a left or right end lane and when no entrance or exit ramp is present within a threshold distance ahead of the current driving lane.

13. The platooning controller of claim 1, wherein the processor changes a lane of a leading vehicle, decelerates the leading vehicle, and controls the leading vehicle to join behind a forefront vehicle among platooning vehicles, traveling behind the outside vehicle.

14. The platooning controller of claim 13, wherein the processor decelerates platooning vehicles, traveling behind the forefront vehicle among the platooning vehicles, traveling behind the outside vehicle, such that the leading vehicle joins behind the forefront vehicle.

15. The platooning controller of claim 1, wherein the processor controls a first vehicle line to join a second vehicle line lane, when the vehicle platooning line is divided into a forward vehicle line, traveling in front of the outside vehicle, and a following vehicle line, traveling behind the outside vehicle with respect to the outside vehicle,
wherein the first vehicle line is the forward vehicle line and the second vehicle line is the following vehicle line when the forward vehicle line includes fewer of the platooning vehicles than the following vehicle line does, and
wherein the first vehicle line is the following vehicle line and the second vehicle line is the forward vehicle line when the following vehicle line includes fewer of the platooning vehicles than the forward vehicle line does.

16. The platooning controller of claim 15, wherein the processor controls the second vehicle line to travel at a same speed as the first vehicle line and controls a tail end vehicle in the second vehicle line to travel at a speed lower than the first vehicle line when the first vehicle line changes its lane and when the tail end vehicle in the second vehicle line is in a same location as a forefront vehicle in the first vehicle line.

17. The platooning controller of claim 1, further comprising:
a sensing device configured to sense whether the outside vehicle is in the middle of the vehicle platooning line.

18. A platooning control method, comprising:
detecting a presence of an outside vehicle in a vehicle platooning line of platooning vehicles during platooning;
calculating a waiting time for an expected departure of the outside vehicle based on surrounding information when the outside vehicle is present; and
forming a platoon of the platooning vehicles again when the outside vehicle does not depart from the vehicle platooning line after the waiting time.

19. The platooning control method of claim 18, further comprising:
calculating an outside vehicle detection time from a time when the outside vehicle is initially detected to a current time.

20. The platooning control method of claim 19, wherein the forming of the platoon again includes:
comparing the outside vehicle detection time with the waiting time;
determining whether a speed difference value between a first platoon vehicle, traveling in front of the outside vehicle, and a second platooning vehicle, traveling behind the outside vehicle, is greater than a predetermined threshold speed; and
determining whether a distance value between the first platoon vehicle, traveling in front of the outside vehicle, and the second platooning vehicle, traveling behind the outside vehicle, is greater than a predetermined threshold distance.

* * * * *

UNITED STATES PATENT AND TRADEMARK OFFICE
CERTIFICATE OF CORRECTION

PATENT NO. : 11,417,218 B2
APPLICATION NO. : 16/822604
DATED : August 16, 2022
INVENTOR(S) : Kyung Joo Bang It is certified that error appears in the above-identified patent and that said Letters Patent is hereby corrected as shown below:

In the Claims

Claim 15, Column 15, Line 23:
"line lane, when the vehicle platooning line is divided into a"
Should be replaced with:
--line when the vehicle platooning line is divided into a--

Signed and Sealed this
Fifteenth Day of November, 2022

Katherine Kelly Vidal
*Director of the United States Patent and Trademark Office*